Patented Mar. 22, 1938

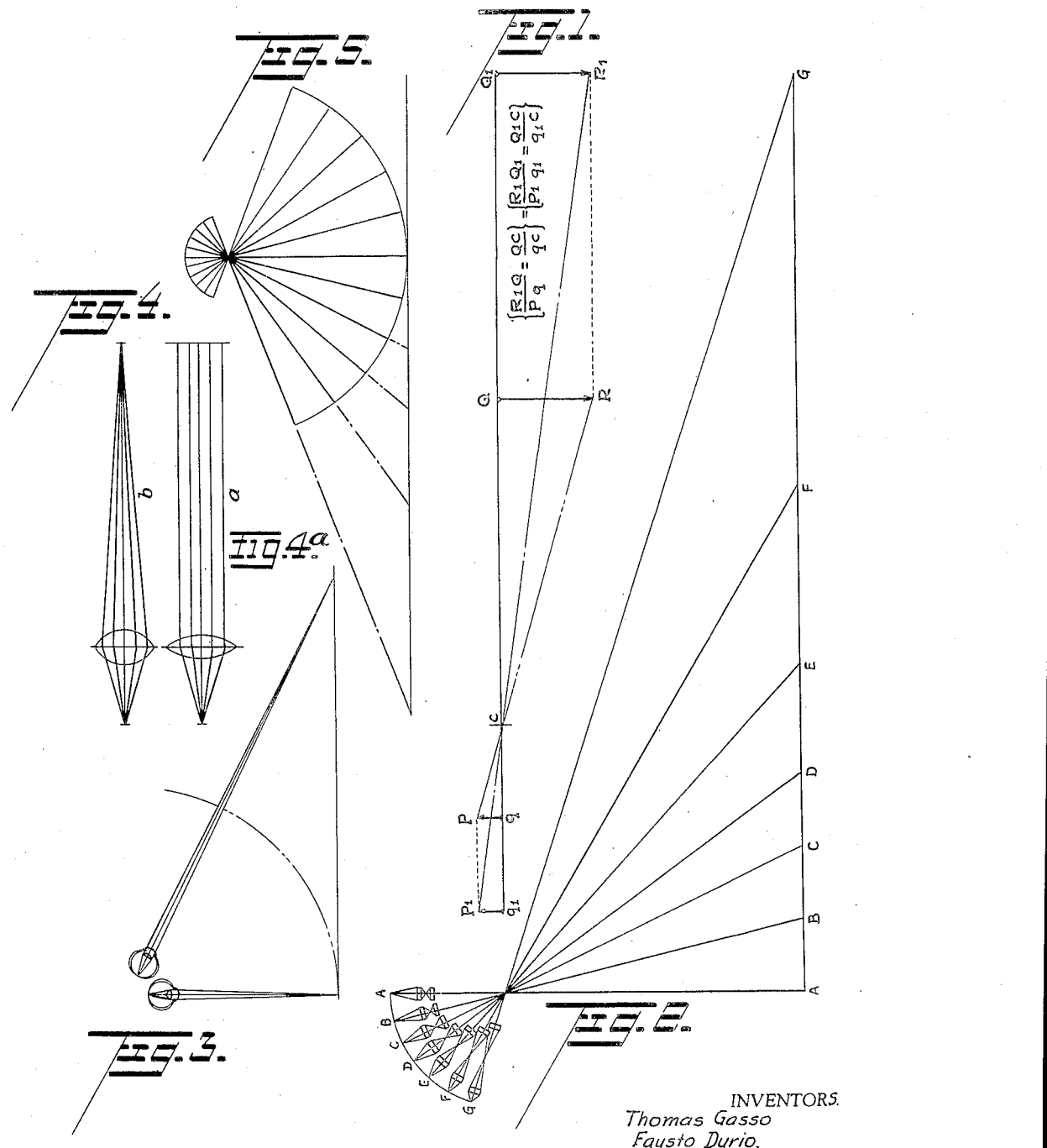

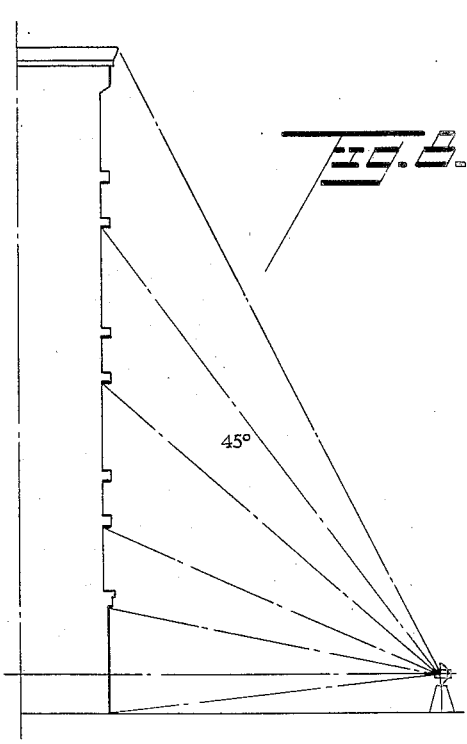
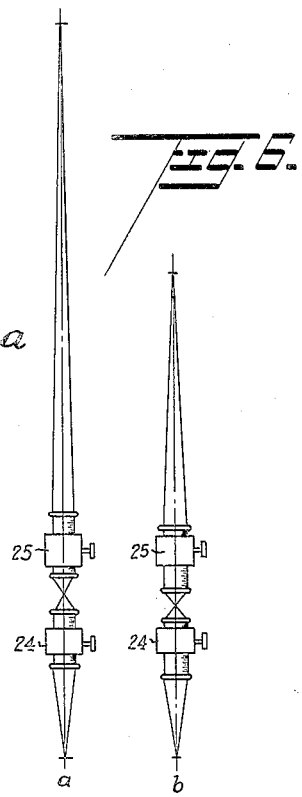
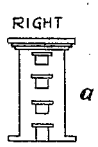
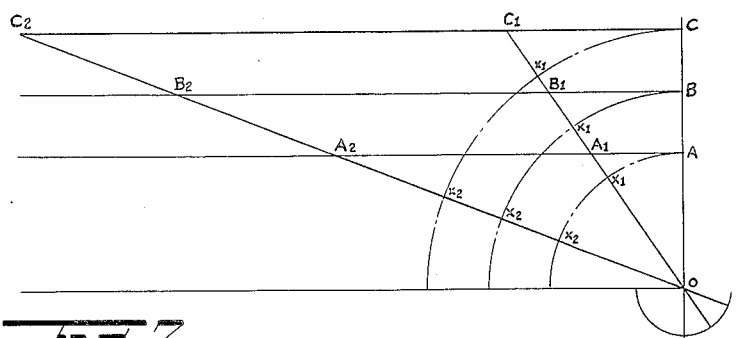

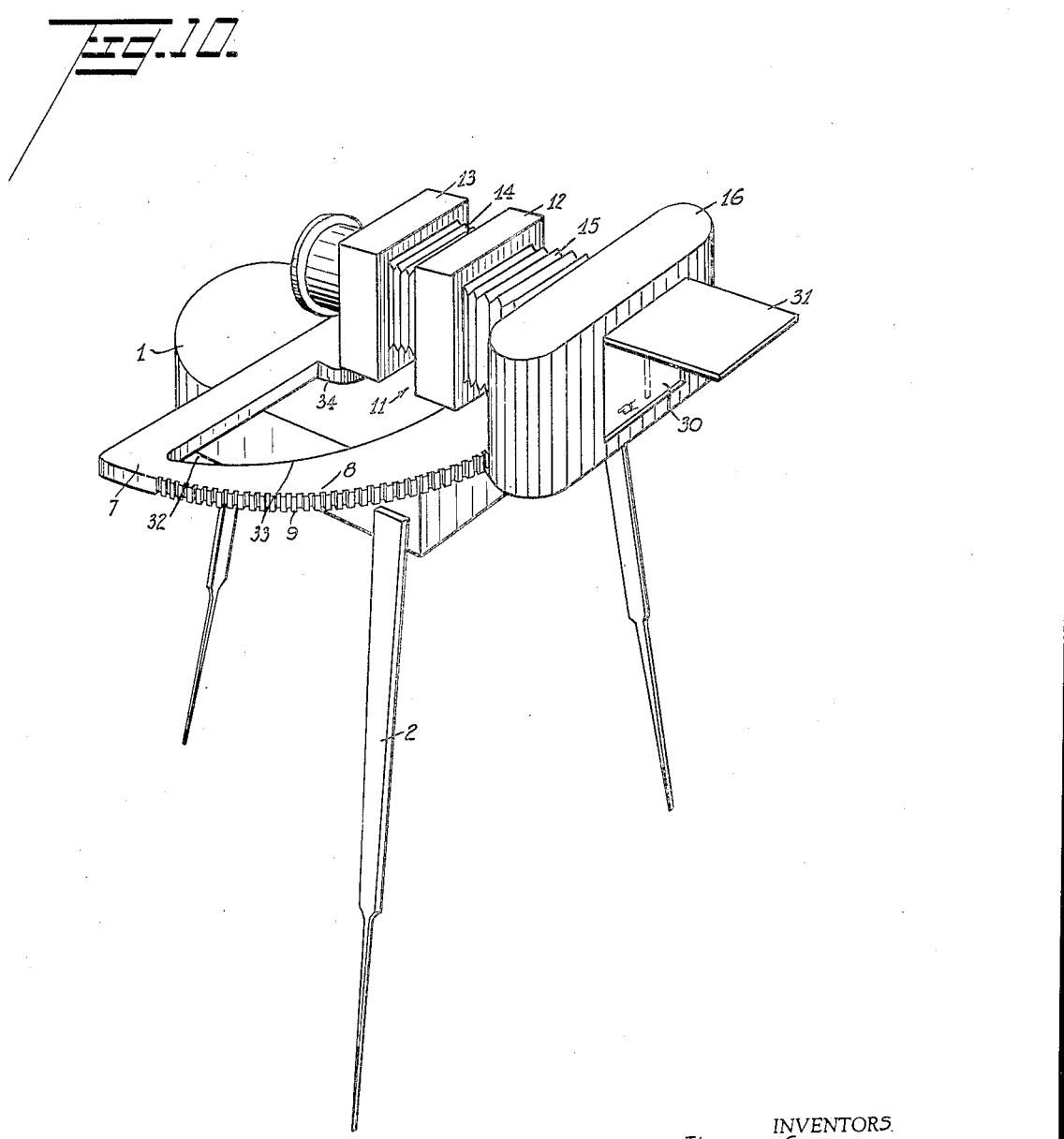

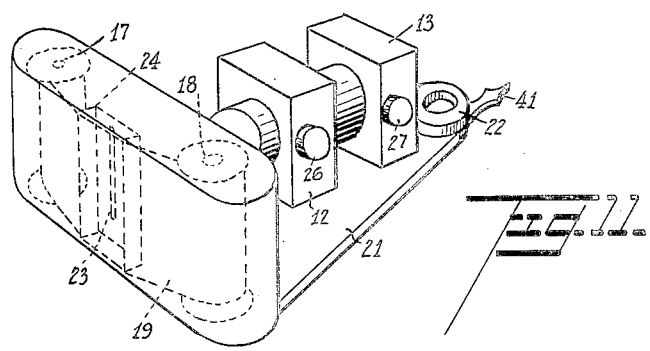
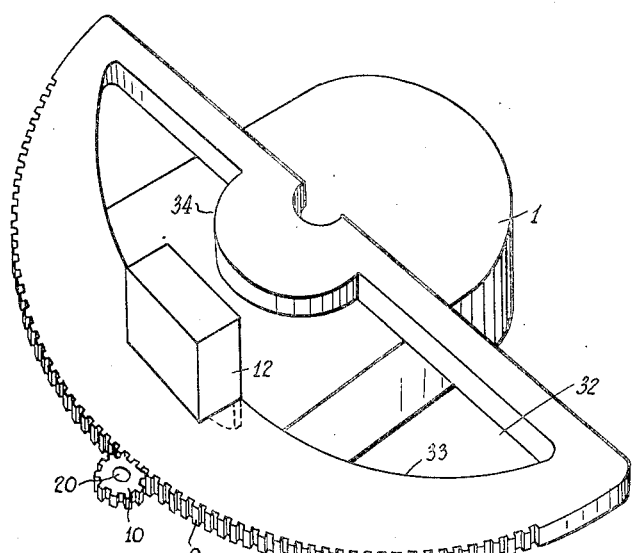

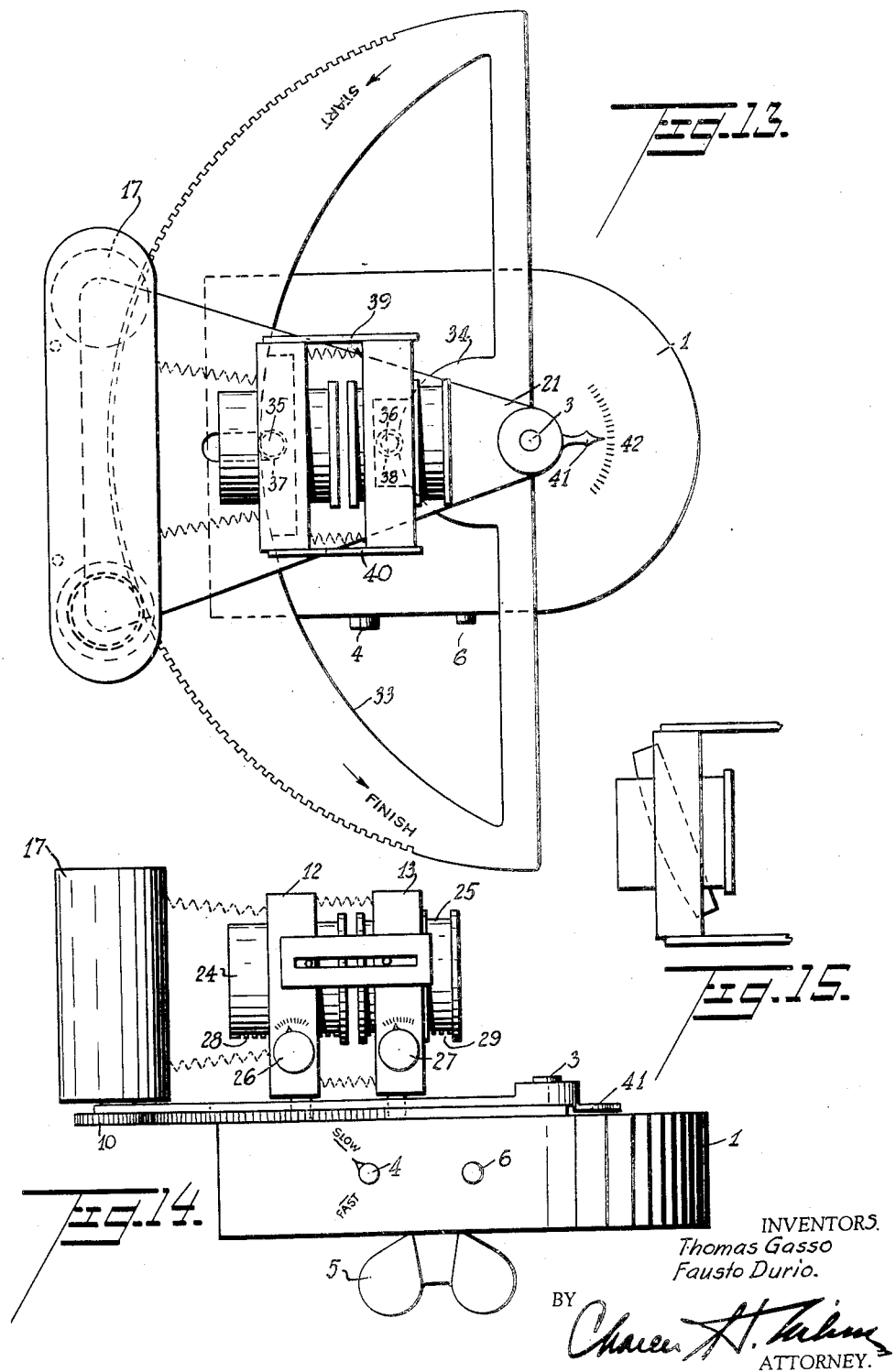

2,111,854

UNITED STATES PATENT OFFICE 2,111,854

PANORAMIC CAMERA

Thomas Gassó and Fausto Durio,
Habana, Cuba

Application June 21, 1935, Serial No. 27,680

6 Claims. (Cl. 95—15)

This invention relates to the art of photography, more particularly to a camera designed to record panoramic scenes, the instrument being known in the art as a panoramic camera.

The prime object of the invention is to provide a new and improved apparatus of the above type wherein the distorted perspectives produced by cameras of this type as hitherto constructed are eliminated. More particularly our invention consists in providing a new and improved rotating camera designed to produce a correct perspective on a flat plate or film of a panoramic view or scene.

Another object of the invention is to provide a new and improved apparatus of the above type wherein objects or persons located at a further distance from the camera are given the same dimensions on the camera plate or film as are given objects or persons of the same size or dimensions located nearer the camera.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings wherein we have illustrated a preferred form of embodiment of our invention, Figure 1 illustrates diagrammatically together with the equation the relativity existing between the size of an object and its distance from the lens, and between the lens and the distance and size of the image of said object as projected on the focusing screen of a photographic camera.

Figure 2 illustrates diagrammatically the manner in which by a relative adjustment of the respective lenses of a photographic camera an operation of accommodation is accomplished in the same manner in which such accommodation is accomplished by the human eye.

Figures 3, 4, 4A are diagrammatic views in which is illustrated the manner in which the crystalline lens of the eye increases or decreases its refractive power when the eye is directed toward objects located at varying distances from the point of vision whereby the images of said objects on the retina of the eye will not appear distorted.

Figure 5 is a diagrammatic view illustrating the form in which panoramic view photographers place their objects in the case of living objects to eliminate aberrations or distortions in the taking of the view, the necessity for such placing of a subject being eliminated by our improved apparatus.

Figures 6 and 6A are schematic views showing the relative adjustment of the lenses according to the varying distances of the panorama that is to be photographed.

Figure 7 is a diagrammatic view to demonstrate that when the lenses are adjusted to the distances A, B and C respectively, and that when the lenses are directed toward points $A^1$, $B^1$ and $C^1$ or toward $A^2$, $B^2$ and $C^2$, the mechanism of the apparatus is so self adjusting that such distances appear to be at the points X of the same exponent, for example $A^1$ at $X^1$, $B^2$ at $X^2$, etc.

Figure 8 is a diagrammatic view showing the manner in which the apparatus may be used to photograph a vertical panoramic view, such for instance, as a tall building whereby distortion of the image cast on the photographic plate or film is eliminated.

Figures 9 and 9A are views showing schematically the manner in which distortion of the image of a building is corrected by our improved apparatus, the figure at the right illustrating what would occur to such building if photographed with an ordinary panoramic camera, and the figure at the left illustrating the same building as photographed by our improved apparatus, Figure 10 is a view in perspective of our improved apparatus, Figure 11 is a similar view showing the camera obscura, the lens boxes and their supporting plate, Figure 12 is a similar view showing the housing for the operating mechanism and the plate which operates to move the lenses relatively to each other to accommodate the apparatus for various panoramic distances, Figure 13 is a top plan view of our improved apparatus, Figure 14 is a side elevation thereof, and Figure 15 is a fragmentary top plan view showing details of construction, and indicating by dotted lines the position of one of the lens boxes when the latter has been moved to photograph a distant object of the panoramic view or scene.

Before proceeding with a detailed description of the embodiment of the mechanism herein shown for obtaining the objects sought herein, it may be here pointed out that panoramic cameras as hitherto constructed have produced unsatisfactory results, due to characteristics of their mechanism, in that aberrations and distortions occur in photographing extremes of a panoramic view or scene. Persons or objects situated at the extremes of a panorama when photographed by types of cameras hitherto constructed produce these aberrations or distortions. They do not produce an image on a plate or film of persons or objects which depicts with accuracy their true relative location or situation, and moreover their proportions are considerably diminished when located at greater distances from the camera than when such persons or objects are located closer to the camera.

While the prior art shows that some attempts have been made to produce panoramic cameras wherein it has been sought to eliminate the above named defects, these devices have been cumbersome, expensive to manufacture and have produced unsatisfactory results.

By means of the embodiment of the mechanism employed to carry out our invention, the above named defects are entirely eliminated and our approved apparatus is more effective, cheaper to manufacture and more easily operated than has obtained in the above mentioned panoramic cameras with which it has heretofore been attempted to attain some of the objects of the present invention.

Referring now to the drawings wherein similar reference characters refer to similar parts throughout the several views thereof, the reference numeral 1 denotes a casing which may be mounted upon the legs 2, the latter constituting a tripod support for the panoramic camera and its associated mechanism.

The casing 1 houses a motor mechanism (not shown) which motor mechanism may be an ordinary clock-work device or an electrically driven motor of usual construction, said motor being adapted to impart a rotary movement to the shaft 3 which extends upwardly through the casing 1.

The motor mechanism within the casing 1 will, of course, be provided with the usual timing device whereby a rotary movement with a constant speed may be regulated in the usual manner as by means of a knob 4 extending without the casing. The clock-work is employed to rotate the shaft 3, the clock-work may be wound up by means of the key 5, and a push button 6 may be employed to start the clock-work into operation or to arrest the operation thereof.

The reference numeral 7 denotes a plate fixedly mounted upon the casing 1, said plate being semi-circular in form, the curved edge 8 of said plate being formed on the arc of a circle, the axis of which is the shaft 3. The edge 8 of plate 7 is provided with the gear teeth 9 with which meshes a pinion 10.

The reference numeral 11 denotes a camera of the panoramic type consisting of the lens boxes 12 and 13, the bellows 14 and 15, sections of which bellows connect the lens boxes 12 and 13 together, section 15 of the bellows connecting the lens box 12 with the casing 16, which casing provides a housing for the film spools 17 and 18 as indicated in dotted lines in Figure 11 of the drawings. The film spools 17 and 18 are, of course, pivoted within the casing 16 in the usual manner.

The film 19 passes from one spool to the other, the spool 18 having a shaft 20 which carries the pinion 21, said pinion meshing with the toothed rack 9 formed upon the plate 7.

In the present instance the camera is mounted upon a triangular plate 21 having the circular boss 22 through which extends the shaft 3 of the clock-work or motor mechanism.

The entire camera 11 is mounted upon the plate 21 so that when the latter is rotated by shaft 3, the said camera will be rotated in the arc of a circle, the axis of which is the shaft 3. During the rotating movement of the plate 7, the pinion 10 will be rotated, such rotation causing the film to be drawn from the spool 17 to the spool 18 past a narrow slit 23 formed in a plate 24 located inside of the camera obscura and through which slit passes a fraction of the image projected by the lenses.

The lenses which are of the usual type employed in cameras of this type are carried within the cylindrical tubes 24 and 25, which tubes may be relatively adjusted in their respective lens boxes 12 and 13 as by means of knobs 26 and 27 which operate pinions (not shown) upon the racks 28 and 29 formed in the lens tubes or cylinders 24 and 25. The adjustment of the lens tubes 24 and 25, according to the distance of the panorama to be photographed is indicated in Figure 6 of the drawings.

It will be understood, of course, that each of the lenses of the camera enclosed in the lens tubes or cylinders 24 and 25 is independently adjustable within the lens boxes 12 and 13 respectively, independently of any movement of the lens boxes themselves.

The correct focusing of the camera lens may be determined by an image cast on the focusing plate 30 which may be provided in an opening formed in the rear wall of the film spool casing 16, which opening may be opened and closed as by means of the usual door 31.

The plate 7 is provided with a cutaway portion 32 which defines a parabolic surface 33 and a semi-circular surface 34, the latter being formed upon an arc, the axis of which is the shaft 3. Each of the lens boxes 12 and 13 is provided with a depending circular stud indicated by dotted lines in Figure 13 and bearing reference numerals 35 and 36, said studs carrying rollers 37 and 38 respectively. The roller 37 engages with the parabolic surface 33 and roller 38 engages with the semi-circular surface 34 of the plate 7. The studs 35 and 36 extend downwardly through a longitudinal slot provided in the triangular plate 21.

The lens boxes 12 and 13 are provided with the guide plates 39 and 40 which serve as means to guide their relative movements so that they are always kept face to face or in parallel planes in order that their respective lenses do not lose the optical center which is always to be perpendicular to the plane of the film, the lens boxes 12 and 13 are, of course, constantly urged to a relative separating movement as by means of a suitable spring mechanism (not shown) whereby their respective rollers 37 and 38 will be always held in engagement with the guide surfaces 33 and 34.

A hand or pointer 41 co-operates with a scale 42 provided on the upper wall of the housing 1 may be utilized to give an indication of the angular position of the optical center of the lens with respect to an object to be photographed to be located directly in front of the camera when the latter is in the position shown in Figures 10 and 13 of the drawings.

Having thus described the construction of our improved apparatus, the operation thereof which should be largely understood by those skilled in this art, may be briefly explained as follows:

The focusing of a camera is accomplished in the usual manner employed in focusing cameras of this type by relative adjustment of the lens tubes 24 and 25 as already explained.

The plate 21 is then swung on its axis so that the pinion 10 of the film spool 18 will be located at that part of the rack 9 indicated by the word "Start" in Figure 13 of the drawings.

The motor or clock-work within the casing 1 is then set into operation causing the entire camera to move in a radial direction about the axis of the shaft 3, the camera moving from one extreme to the other.

Due to this motion and the engagement of the rollers mounted upon the lens boxes 12 and 13 with their respective surfaces 33 and 34, the focal length of the lenses will be first shortened to the median point of the apparatus and will again be lengthened as the camera moves to photograph a panoramic view or scene from one extreme to the other.

The parabolic surface 33 is so related to the arc shaped surface 34 of the plate 7 that the focal length of the lens will be varied to compensate for the varied distances of the objects to be photographed from the objective lens of the camera.

During this operation the film 19 has been automatically moved past the light slit 23 of the camera obscura whereby there will be projected on the moving film images which are fractions of the panorama projected thereon by the lens. This result in an enlargement on the firm of the objects located furtherest from the camera to the same dimension as objects of the same size located at the closest distance from the camera. Due to the varying of the focal length of the lenses in mathematical proportions to the varying distances of the objects located in the panorama to be photographed, aberrations or distortions of the images projected upon the film are eliminated. Moreover, the images projected on the film are shown in the correct relative positions as they are actually located in the panoramic view or scene.

When the apparatus above described is to be used for taking perpendicular panoramic views, as indicated in Figures 7, 8 and 9, the same principles are observed for taking horizontal panoramic views. Once the closest point in the view to be photographed by the camera is duly focused, the apparatus is then focused on the base of a building, for instance, and is made to travel the distance from this point to the highest point of the view being photographed thereby producing a photograph without distance aberrations or distortions.

It will accordingly be seen that we have provided an apparatus of the above character of simple construction and which may be used with great efficiency to accomplish, among others, all the ends and objects above pointed out.

The optical principles upon which our invention is founded are fully illustrated diagrammatically in Figures 1 to 9 inclusive of the drawings. These principles have been briefly described in the description of the above enumerated figures of the drawings in an earlier part of this specification. They should be readily understandable by those skilled in this art without further elucidations.

As many changes could be made in this construction without departing from the scope of the following claims, it is intended that all matter contained in the above description or shown in the accompanying drawings shall be interpreted as illustrative only and not in a limiting sense.

Having thus described our invention what we claim as new and desire to secure by Letters Patent is:

1. A camera of the class described comprising a plurality of independently movable lenses which constitute the objective lens of the camera, said camera being adapted to be revolved about a fixed axis, means for movably supporting and guiding an element having a sensitized surface in the focal plane of the camera, means for varying the radial distance of said lenses when said camera is revolved, means for simultaneously revolving said camera and moving said element in said supporting and guiding means relatively to the focal plane of said lenses in a direction opposite the focal movement of the camera.

2. A camera of the class described, comprising in combination, means for revolving said camera about a fixed axis, said camera comprising an objective lens formed by a pair of relatively movable lenses, means for adjusting said lenses for focusing purposes, means for relatively moving said lenses for varying their radial distances to compensate for varying distances from the camera of objects to be photographed, means for movably supporting an element having a sensitized surface in the focal plane of the camera, so that it may be moved in a direction opposite to the focal plane of the camera, and means whereby said above named functions may be accomplished simultaneously.

3. A camera of the class described comprising, in combination, a camera mounted to be revolved about a fixed axis, said camera comprising an objective lens formed by a pair of relatively movable lenses, a tube in which each of said relatively adjustable lenses is mounted, means for moving said tubes for focusing purposes, means for relatively moving said tubes for varying their radial distances to compensate for varying distances from the camera of objects to be photographed, means for movably supporting and guiding an element having a sensitized surface in the focal plane of the camera, and means for simultaneously revolving the camera causing said lens tubes to be moved relatively to each other to change their radial length, and for so moving the means for movably supporting and guiding the element having a sensitized surface that the latter will move past the focal plane of said lenses, and in a direction opposite the focal movement of the camera.

4. A camera of the class described, adapted to be revolved about a fixed axis, a pair of lens boxes, a pair of lens tubes, a pair of lenses which together form the objective lens of the camera, means for moving the lens tubes in their boxes for focusing purposes, means for moving said lens boxes for relatively moving said lenses to vary their radial distances and compensate for varying distances of objects to be photographed, means for movably supporting and guiding an element having a sensitized surface in the focal plane of said camera, time controlled means for simultaneously revolving said camera, causing the means for movably supporting and guiding the element having a sensitized surface in the focal plane of the camera past the focal point of the lenses and in a direction opposite the focal movement of the camera, and for moving the means carrying the said lens boxes whereby the lenses will be moved relatively to each other to compensate for varying distances from the camera of objects to be photographed.

5. An apparatus of the class described comprising, in combination, a camera having a fixed support, the latter being provided with a vertical shaft, time controlled mechanism for revolving said shaft, a plate attached to said shaft, a camera mounted upon said plate and adapted to be revolved thereby with the axis of said shaft as the center of rotation, said camera being provided with a plurality of lenses which together form the objective lens of the camera, a stationary plate having a parabolic cam surface and a surface formed upon the arc of a circle of which the axis of said shaft is the center, means associated with one of said lenses for engaging with said parabolic surface, means associated with the other of said lenses for engaging with said arc shaped surface, means for movably supporting and guiding an element having a sensitized surface in the focal plane of the camera and in a direction opposite the focal movement of the camera comprising spools upon which the element having the sensitized surface is mounted, an arc shaped rack formed upon said fixed plate, and a pinion mounted upon the shaft of one of said spools which meshes with said rack.

6. An apparatus of the class described, comprising, in combination, a fixed support, a time controlled removable shaft mounted upon said fixed support, a camera, a support for said camera mounted upon said shaft whereby said camera will be rotated together with this support when said shaft is rotated, a fixed plate having an interior parabolic cam surface and an exterior arc shaped surface, the center of said arc shaped surface coinciding with the axis of rotation of said shaft, a pair of lens boxes, a lens tube movably mounted in each of said lens boxes, a lens mounted in each of said lenses together forming the objective lens of the camera, means for relatively moving said tubes in their boxes for focusing purposes, an arc shaped rack formed upon the outer edge of said fixed plate, the center of said arc being the axis of rotation of said shaft, a film box, spools within said box, means for movably supporting and guiding an element having a sensitized surface in the focal plane of the camera, so that said element will be moved in a direction opposite the focal movement of the camera, comprising said spools, a pinion mounted upon the shaft of one of said spools and meshing with said arc shaped rack, means connected with one of said lens boxes for transversing said parabolic cam surface when the camera is rotated upon its said arc shaped surface when said camera is rotated with its support.

THOMAS GASSÓ.
FAUSTO DURIO.